Figure 1:
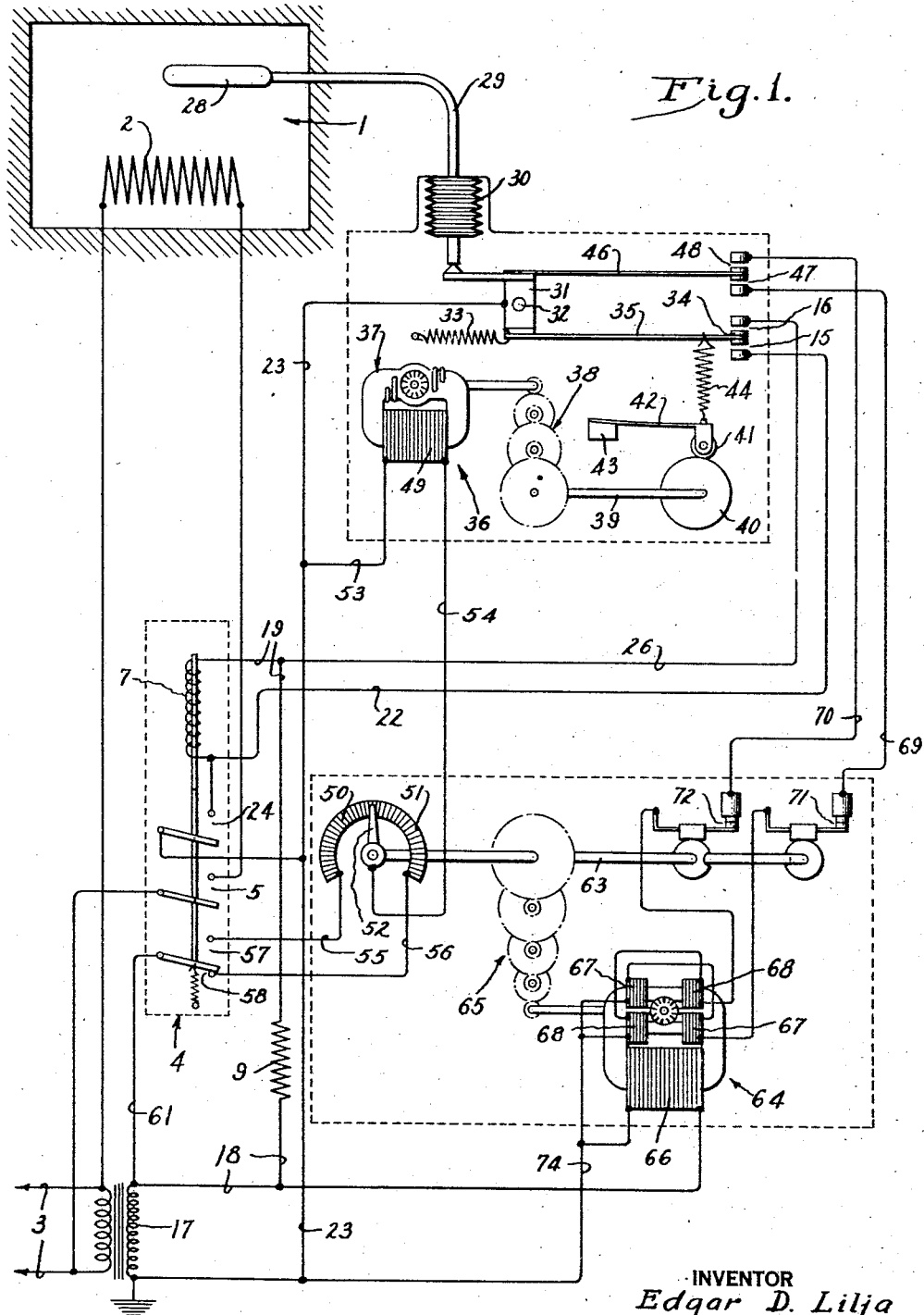

Oct. 8, 1946.　　　　　E. D. LILJA　　　　　2,409,136
CONDITION CONTROL
Filed Sept. 22, 1941　　　　　2 Sheets-Sheet 1

INVENTOR
Edgar D. Lilja
BY
ATTORNEYS

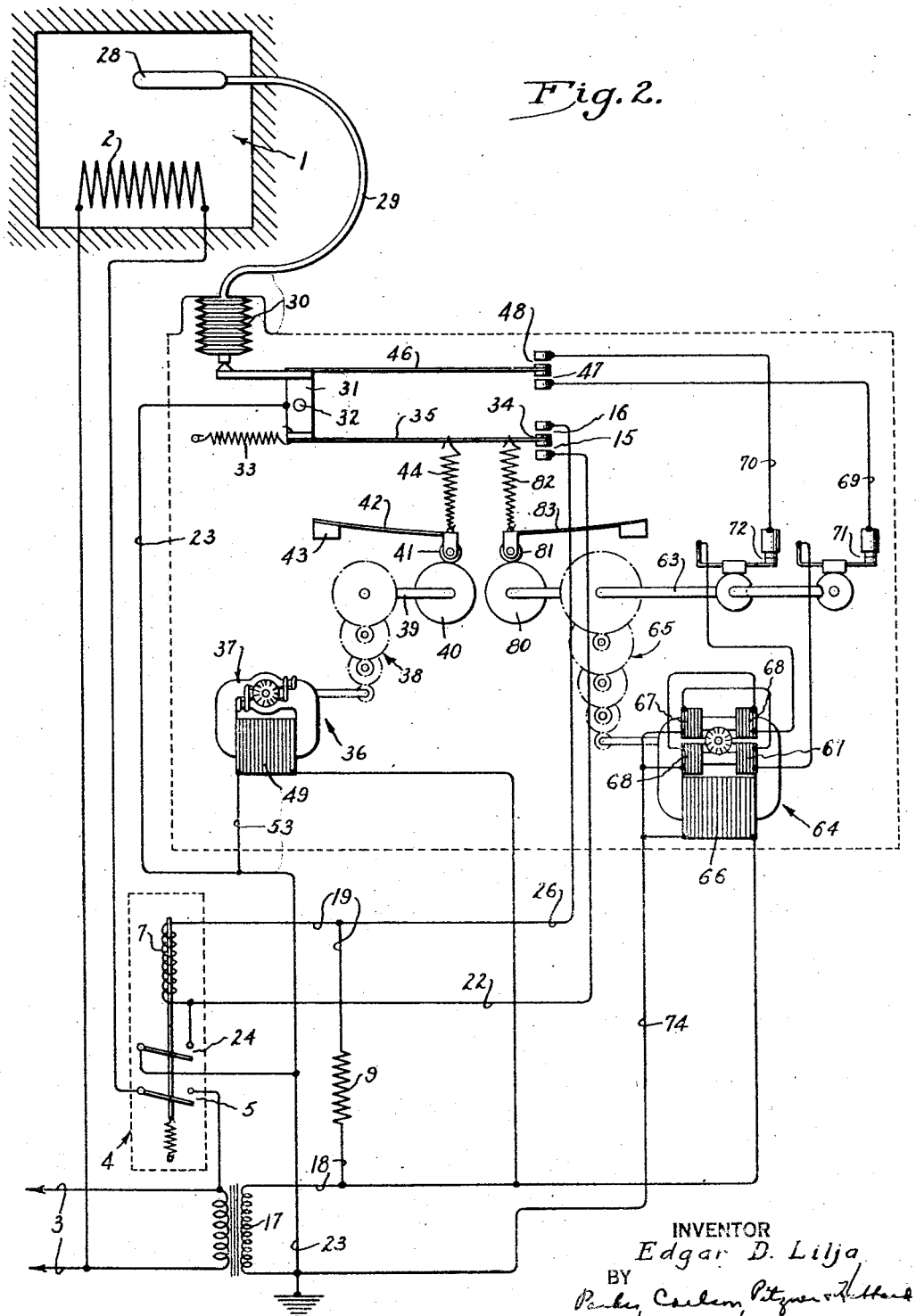

Patented Oct. 8, 1946

2,409,136

UNITED STATES PATENT OFFICE 2,409,136

CONDITION CONTROL

Edgar D. Lilja, Rockford, Ill., assignor to Barber-Colman Company, Rockford, Ill., a corporation of Illinois Application September 22, 1941, Serial No. 411,893

6 Claims. (Cl. 236—46)

This invention relates to the control of conditioning apparatus to maintain a condition to be controlled at a substantially uniform value. It has more particular reference to controls of the type in which a member regulating the conditioning apparatus is moved intermittently and alternately to fixed condition-increasing and condition-decreasing positions, the relative lengths of the on and off periods being varied with condition changes. A control of this character operates with a so-called proportioning action, that is, the maintained condition changes in proportion to the conditioning load.

The primary object of the present invention is to eliminate such shifting of the maintained condition with load changes.

A more detailed object is to provide for varying the relative lengths of the condition-increasing and condition-decreasing intervals automatically in response to deviations of the controlled condition from a desired value.

The invention also resides in the novel construction of the mechanism for carrying out the foregoing objects.

Other objects and advantages of the invention will become apparent from the following detailed description taken in connection with the accompanying drawings, in which Figure 1 is a schematic view and wiring diagram illustrating a typical application of the improved control.

Fig. 2 is a similar view of a modification.

The invention is susceptible of a wide variety of uses and is adaptable to the control of any physical or chemical condition such, for example, as temperature, pressure, and electrical quantities that gives rise to variations in a measurable force which may be utilized in producing selective controlling action. One typical use has been shown in the drawings and will be described in detail herein, merely for purposes of illustration. It is to be understood, however, that I do not intend to limit the invention in any way by such exemplary disclosure but aim to cover all modifications, alternative constructions, methods, and uses falling within the spirit and scope of the invention as expressed in the appended claims.

The improved control is shown in the drawings as applied to a system for governing the temperature of an oven chamber 1 heated, in this instance, by an electric heater 2 supplied with current from a line 3. The flow of current to the heater and therefore the amount of heat delivered thereby is regulated by a relay 4 having a switch 5 constituting a regulating member and movable between open position in which the heat is turned off and closed position in which the electric heater is turned on.

Herein, the relay switch is actuated by a magnet 7 the energization of which is controlled by closure of condition responsive switches 15 and 16. Closure of the switch 15 completes a closing circuit for the relay magnet 7 extending from a source 17 of alternating current through a conductor 18, a resistor 9, conductor 19, magnet 7, conductor 22, the switch 15, and a power conductor 23. When the relay is thus closed, its magnet current is maintained by closure of a parallel circuit through a switch 24 interposed between conductors 22 and 23. When the switch 16 is closed with the relay closed, a short-circuit is established across the magnet 7, extending from conductor 23 through switch 16 and conductor 26, causing the relay to open. Resistor 9 is interposed between line 18 and conductor 26 to limit the line current during the short-circuit.

The switches 15 and 16 form part of an instrument responsive to changes in the oven temperature. As shown, it comprises a fluid filled bulb 28 communicating through a tube 29 with a bellows 30, the expansion of which turns a lever 31 about a pivot 32 against the action of a spring 33. The common contact 34 of the control switches is on the free end of a flexible metal strip 35 attached at its other end to the lever 31 so that the switch 15 is closed as the oven temperature falls below the prevailing control point of the instrument. The switch 16 is closed when the oven temperature is above the instrument control point. By adjusting means (not shown), the control point of the instrument may be set manually for the maintenance of a desired oven temperature.

Alternate and progressive raising and lowering of the control point as contemplated by the present invention may be effected in various ways, being accomplished in the present instance by an electric power operator 36 acting mechanically on the contact arm 35. The operator comprises a continuously operating unidirectional electric motor 37 operating through speed reduction gearing 38 to drive a shaft 39 carrying an eccentric cam 40. This cam acts on a follower 41 mounted on the free end of a spring arm 42 fastened at 43 and connected to the contact arm 35 through the medium of a light contractile spring 44 which is maintained under continuous tension by the action of the spring arm 42 in holding the follower in contact with the cam.

As the cam rotates, say at a rate of one revolution in five minutes, the force which the spring 44 exerts on the contact arm 35 will be alternately and progressively increased and decreased, thereby correspondingly raising and lowering the control point of the instrument, that is, the oven temperature at which the arm will stand in neutral position with both of the switches 15 and 16 open. At one point during raising of the control point, the spring tension will be increased sufficiently to cause closure of the switch 15 whereupon the magnet will be energized and the switch 5 closed to initiate an "on" period of the heater 2. The relay switch remains closed during the continued increase in the spring tension and part of the succeeding decrease. At a certain point in the latter, depending on the prevailing oven temperature, the tension on the arm will have decreased sufficiently to permit the switch 15 to open and also the switch 16 to close. The magnet is thus deenergized and the switch 5 opened, thereby initiating a heat "off" period which continues until the succeeding increase in spring tension whereupon the operation of the switches as above described is repeated.

It will be observed from the foregoing that the proportion of each cam cycle during which the heater remains energized is proportional to the amount that the oven temperature deviates below the instrument setting because the points in the cycle at which the switches 15 and 16 become closed are determined by the oven temperature which results in a change in the forces applied to the arm 35 in opposition to the spring 44. As a result, the heating capacity of the heater coil, that is, the average rate of heat supply, will always be proportional to the demand, a true proportioning action thus being obtained so that the average rate of heat supply varies automatically in proportion to oven temperature changes.

A proportioning control of the character above described is open to the objection that the maintained oven temperature varies with changes in load, that is, falls below the desired value as the load increases and rises progressively above such value as the load decreases. Such shifting of the maintained temperature is overcome by the present invention by automatically varying the length of the "on" period relative to the "off" period so long as the controlling temperature continues to deviate from an invariable value desired to be maintained. To this end, the thermostat previously described is utilized to perform the additional function of detecting deviations of the oven temperature from that desired. For this purpose, the lever 31 is equipped with a second spring arm 46 made sufficiently flexible so as not to influence the tension of the spring 44. It carries the movable contact of control switches 47 and 48 which are closed respectively whenever the oven temperature is below or above the value desired.

In the form shown in Fig. 1, the auxiliary condition responsive switches are utilized to vary the relative lengths of the "on" and "off" periods by varying the speed of the motor 37, the energizing circuit of which is extended through one resistance 50 during the "on" period and through a resistance 51 during the "off" period, the two resistances being connected together and varied simultaneously by movement of a wiper arm 52. Thus, one terminal of the motor winding is connected to one power line through a conductor 53 while the other terminal leads through a conductor 54 connected to the wiper 52. The remote terminals of the resistances 50 and 51 are connected by conductors 55 and 56 to switches 57 and 58 which are closed respectively during the "on" and "off" positions of the movable member of the switch 5. A conductor 61 connects these switches to the other power line 13. With this arrangement, it will be observed that the switch 58 will be closed and resistance 51 will be interposed in the circuit for the timing motor during the "off" period. Opening of this switch and closing of the switch 57 interpose the resistance 50 in the circuit while the relay is closed.

The wiper 52 is on a shaft 63 driven at a very slow speed by a reversible motor 64 operating through reduction gearing 65. This motor has a winding 66 constantly energized from the source 17 and the shading windings 67 and 68 respectively connected to the contacts of the switches 47 and 48 through conductors 69 and 70 having cam operated limit switches 71 and 72 interposed therein. The short-circuits for the shading windings are completed through conductors 74 and 23.

It will be apparent from the foregoing that when the oven temperature is at the desired value, both switches 47 and 48 will be open and the motor 64 will remain idle. If, at any time, the temperature rises above the desired value closing the switch 48, the shading coils 68 will be short-circuited and the motor will run in a direction to turn the wiper 52 counter-clockwise, thereby increasing the value of the resistance 51 and correspondingly decreasing the resistance 50. As a result, the speed of the timing motor 37 is increased during the heat-on period and reduced during the "off" period. Accordingly, the average rate of heat supply is decreased progressively but at a very slow rate as long as the oven temperature remains above the desired value.

The reverse action takes place so long as the oven temperature continues below the value desired. In this case, the switch 47 is closed causing the motor 64 to run in a direction to turn the wiper 52 clockwise, the "on" and "off" periods being thus respectively increased and decreased in length. The average rate of heat supply is thus increased until the desired oven temperature has been restored as evidenced by opening of the switch 47.

In the form shown in Fig. 2, the restoring action controlled by the switches 47 and 48 is effected by applying to the contact arm 35 a continuous force supplementing the force of the spring 44 and increased or decreased progressively as the motor 64 runs in opposite directions. This auxiliary force is derived through a cam 80 on the shaft 63 operating on a follower 81 which is urged against the cam by the spring 83 carrying the follower and is connected to the arm 35 through the medium of a contractile spring 82 under a normal tension. The cam is shaped to cause an increase in the spring tension progressively as the motor 64 turns the cam clockwise and to correspondingly decrease the auxiliary force on the arm as the motor runs reversely when the switch 48 is closed. As a result, the effective control point of the condition-responsive instrument is increased progressively and the heat "on" period is similarly increased while the switch 47 remains closed. Conversely, the length of the "off" period relative to the "on" period is increased progressively and at a slow rate while the switch 48 remains closed due to the controlled condition being above the desired value.

The ultimate effect of varying the speed of the timing motor (Fig. 1) or changing the secondary mechanical force normally exerted on the contact arm 35 (Fig. 2), is to overcome the shift of the maintained oven temperature that would result from the action of the timing mechanism and the condition-responsive switches 15 and 16 acting alone. That is to say, the relative lengths of the condition-increasing and condition-decreasing periods controlled by the joint action of the timing mechanism and the condition-responsive switches 15 and 16 are varied progressively during the continuance of a condition deviation from the value desired to be maintained as determined by the action of the independently condition-responsive switches 47 and 48. Thus, the control maintains a temperature determined by the response of the switches 47 and 48, which temperature is within the proportioning range established under the control of the switches 15 and 16.

The applicability of the condition control as above described to many different uses will be readily apparent. For example, the lever 31 may be adjusted by power actuated means controlled by some device sensitive to the condition to be controlled. Similarly, the character of the device governing the conditioning capacity will be governed by the kind of apparatus being controlled and the character of the condition to be regulated.

I claim as my invention:

1. The combination of a condition-responsive instrument having a variably adjustable control point, mechanism including an electric timing motor operating continuously to raise and lower said control point alternately through a fixed range, voltage regulating means governing the speed of operation of said motor during the raising and lowering periods, a reversible motor operable to actuate said voltage regulating means and decrease or increase the voltage applied to said timing motor according to the direction of operation of the reversible motor, and means responsive to deviations of said condition from a predetermined desired value to determine the direction and extent of operation of said reversible motor.

2. The combination of a condition-responsive instrument having a variably adjustable control point, mechanism including a timing motor operating continuously to raise and lower said control point alternately, selectively adjustable voltage regulating means acting during the raising and lowering periods to govern the speed of said motor, a reversible motor operable to decrease or increase the speed adjustment of said voltage regulating means according to its direction of operation, and means responsive to deviations of said condition from a predetermined desired value to determine the direction and extent of operation of said reversible motor.

3. A system for controlling the operation of conditioning apparatus to maintain a uniform condition comprising, in combination, condition responsive means responsive to changes in the values of said condition, a control device actuated by said condition responsive means and having a control point variable through a range of values of said condition, timing means operable to alternately increase and decrease the control point of said device progressively within said range, an auxiliary control device directly responsive to changes in the same condition as said control device and operable to detect deviations of said condition above and below a predetermined value included in said range of condition values, and means controlled by said auxiliary control device and operable to additionally decrease and increase the control point of said device at a slow rate when the value of said condition is respectively above and below said predetermined value and to terminate such decrease or increase when the condition has been restored to said predetermined value.

4. A system for controlling the operation of conditioning apparatus to maintain a uniform condition comprising, in combination, condition responsive means directly responsive to changes of said controlled condition, two control devices actuated by said condition responsive means, one having a control point corresponding to a predetermined value of said condition and the other having a control point variable through a range of values of said condition including said predetermined value, timing means operable to alternately increase and decrease the control point of said second device progressively within said range, and means controlled by said first mentioned device and operable throughout the continuance of said condition above and below said predetermined value to respectively and additionally decrease and increase the control point of said second device at a slow rate.

5. Apparatus for controlling the operation of conditioning apparatus to maintain a uniform condition comprising, in combination, a single condition responsive means directly responsive to changes of said controlled condition, two control devices movable relative to each other and each actuated by said single condition responsive means, one having a control point corresponding to a predetermined value of said condition and the second having a control point variable through a range of values of said condition including said predetermined value, timing means operable to alternately increase and decrease the control point of said second device progressively within said range of condition values, and means controlled by said first device and operable throughout the continuance of said condition above and below said predetermined value to respectively and additionally decrease and increase the control point of said second device at a slow rate.

6. The combination with a regulating member movable to condition-increasing and condition-decreasing positions of, condition responsive means directly responsive to changes in the ambient condition to be controlled, two devices actuated by said condition responsive means and urged in one direction or the other in accordance with changes in said condition, one of said devices controlling said member to cause movement thereof to condition-increasing and condition-decreasing positions respectively in response to falls and rises in the value of said controlled condition below and above the control point of such device, timing means operable to alternately increase and decrease said control point through a predetermined range of said controlled condition whereby to cause operation of the apparatus to be controlled in successive frequently recurring condition-increasing and condition-decreasing intervals, the other of said devices detecting deviations of said controlled condition in either direction from a predetermined value within said range, and means controlled by said last mentioned device and operable to change the lengths of said condition-increasing intervals relative to the condition-decreasing intervals throughout the continuance of a deviation of said controlled condition away from said predetermined value.

EDGAR D. LILJA.